United States Patent [19]

Matsumoto et al.

[11] Patent Number: 4,553,579
[45] Date of Patent: Nov. 19, 1985

[54] PNEUMATIC TIRES HAVING A HIGH RESISTANCE TO CUT GROWTH

[75] Inventors: Kenji Matsumoto, Kodaira; Yasuo Suzuki, Akigawa, both of Japan

[73] Assignee: Bridgestone Tire Company Limited, Tokyo, Japan

[21] Appl. No.: 618,752

[22] Filed: Jun. 7, 1984

Related U.S. Application Data

[60] Continuation of Ser. No. 438,187, Nov. 1, 1982, abandoned, which is a division of Ser. No. 324,898, Nov. 25, 1981, abandoned.

[30] Foreign Application Priority Data

Dec. 3, 1980 [JP] Japan .................................. 55-169658
Dec. 3, 1980 [JP] Japan .................................. 55-169659

[51] Int. Cl.$^4$ ........................... B60C 5/14; B60C 1/00
[52] U.S. Cl. .......................... 152/450; 152/DIG. 16; 152/548
[58] Field of Search ........... 152/330 R, 353 R, 354 R, 152/354 RB, 355, 356, 357 R, 360, DIG. 4, DIG. 16, 374

[56] References Cited

U.S. PATENT DOCUMENTS

| | | | |
|---|---|---|---|
| 3,464,477 | 9/1969 | Verdier | 152/353 R |
| 3,709,277 | 1/1973 | Montagne | 152/355 |
| 4,044,811 | 8/1977 | Dudek et al. | 152/354 R |
| 4,284,116 | 8/1981 | Sato et al. | 152/360 |

FOREIGN PATENT DOCUMENTS 764942 8/1967 Canada .............................. 156/306.6

Primary Examiner—Lois E. Boland
Attorney, Agent, or Firm—Sughrue, Mion, Zinn, Macpeak and Seas

[57] ABSTRACT

A pneumatic tire having an excellent cut resistance is disclosed, which comprises an annular crown portion constituting a tread, a pair of side portions supporting said crown portion, a pair of bead portions located at each foot of said side portions for fitting to a rim, a carcass layer composed of at least one rubberized cord ply toroidally extending between said bead portions and a liner layer disposed indise and adjacent to said carcass layer.

In the tire according to the invention, a fault surface having an extremely low adhesion which intercepts the crack growth from the outside of the tire is further arranged in said liner layer at at least a part of a region extending between said bead portions.

In the other tire according to the invention, for intercepting the crack growth from the outside of the tire, a low modulus middle rubber layer composed of rubber having a modulus lower than that of the adjoining rubber is further arranged in the tire at at least a part of a region extending between said bead portions.

The growth of the cut damage especially given to the side portions of the tire is prevented by the fault surface or the low modulus middle rubber layer.

10 Claims, 8 Drawing Figures

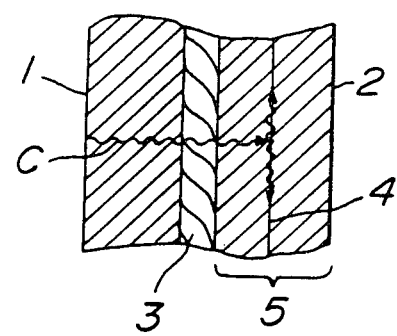
FIG_1
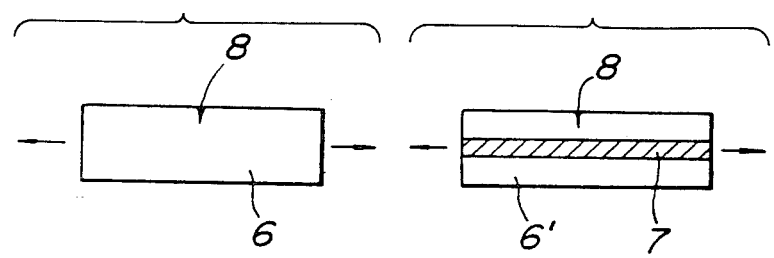
FIG_2a  FIG_2b

PNEUMATIC TIRES HAVING A HIGH RESISTANCE TO CUT GROWTH

This is a continuation of application Ser. No. 438,187, filed Nov. 1, 1982, now abandoned, which is a division of application Ser. No. 324,898, filed Nov. 25, 1981, now abandoned.

BACKGROUND OF THE INVENTION

This invention relates to pneumatic tires, and more particularly to pneumatic tires having a high resistance to cut growth, which are used in vehicles running on a road, at least a part of which includes a rough road being apt to give cut failure to the tire. Especially, it relates to the tires of this type having an improved performance against cut damage in applications for construction truck, dump truck and the like.

Since the tires of this type are mainly used on rough roads not arranged as a running road, the tire body, particularly the side portion thereof is frequently subjected to cut damage due to the contact with sheer stones and rocks, pieces of broken metal, stubs after felling or the like. When such cut damage is once produced, this damage gradually grows with the continuous running of the tire and proceeds into the inside of the tire and finally arrives at the carcass layer, whereby separation failure of carcass ply or plies constituting the carcass layer is caused. Alternatively, the cut damage further penetrates over the carcass layer into the inside of the tire to cause air leakage.

In general, a risk of causing the above failures tends to be higher in the side portion of the tire than in the crown portion thereof because the side portion is quite in a defenseless state as compared with the crown portion which is provided with a thick tread rubber and reinforced with a belt or breaker layer. Further, this tendency is more conspicuous in the side portion of pneumatic radial tires comprising a carcass layer of a so-called radial structure and a belt layer superimposed thereabout, wherein the carcass layer is composed of at least one rubberized ply each ply containing steel cords arranged substantially parallel to the radial plane of the tire and the belt layer has a high circumferential rigidity.

As a countermeasure against cut damage as well as the separation failure of carcass ply and the air leakage failure accompanied therewith, there have hitherto been made various attempts, but satisfactory results have not been attained by anyone of these attempts.

For instance, there is a first-type attempt wherein a reinforcing cord layer of fiber material is disposed in the side portion of the tire outside the carcass layer to make the depth of side cut damage shallow as disclosed in U.S. Pat. No. 3,703,203. In this case, the effect for preventing cut damage itself is improved to some extent, but with the cut damage is once caused, the growth of such cut damage cannot be prevented and further the separation failure is apt to occur from the end of the reinforcing cord layer. The similar result fundamentally results even when the cord of the reinforcing cord layer is composed of metallic material.

As disclosed in U.S. Pat. No. 3,457,981, a second-type attempt is wherein a rubber swollen portion is disposed in a region extending from the shoulder portion of the tire to the side portion thereof to prevent the side cut. In this case, the protection for the side portion is effectively attained to some extent, but when the cut damage is caused once likewise the first-type attempt, the growth of such cut damage cannot be prevented.

As a third-type attempt, a thick rubber layer is disposed in the side portion of the tire inside the carcass layer as disclosed in U.S. Pat. No. 3,464,477. In this case, it is anticipated that the rubber layer prolongs a time until air leakage is caused after the occurrence of cut damage, but the growth of the cut damage cannot basically be prevented. Therefore, the arrangement of the rubber layer does not sufficiently contribute to improve the resistance to air leakage. Furthermore, the increase of the thickness of the rubber layer increases the total amount of rubber to increase the heat generation. The strain applied to the bead portion and the end portion of the belt layer is increased and as the result, the durability of the tire is deteriorated and the production becomes difficult and the cost is increased.

In the light of the above mentioned drawbacks of the prior art, according to the invention, a tire mounted on vehicles running on rough road, particularly the side portion thereof is unavoidably subjected to cut damage to some extent. So, an object of the present invention is to obviate various drawbacks in the above described prior art and to highly improve the performance for preventing the air leakage of the tire and further the separation failure of the carcass ply without sacrificing other tire performance by advantageously preventing the growth of the cut damage which is subjected to the tire, particularly the side portion of the tire mounted on vehicles running on rough roads and penetrates towards the inside of the tire.

As a result of many experiments and various investigations, the inventors have found that if a fault surface having an extremely low adhesion or a middle rubber layer having a modulus lower than that of the adjoining rubber is provided at the interior of the rubber layer of the tire, the crack growth from the outer surface of the rubber layer is blocked by the fault surface or the low modulus middle rubber layer.

BRIEF DESCRIPTION OF THE DRAWING

The invention will now be described with reference to the accompanying drawings, wherein:

FIG. 1 is a partial cross-sectional view showing the state where the growth of a crack is intercepted by the fault surface having an extremely low adhesion;

FIGS. 2a and 2b are schematical views of test pieces to be used in the experiment for the intercepting of crack growth in the absence or presence of low modulus middle rubber layer, respectively;

DESCRIPTION OF THE PREFERRED EMBODIMENT

Figure 3:
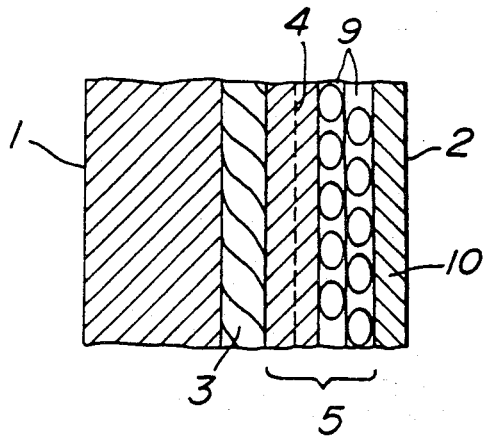
FIG. 3 is a partial cross-sectional view of an essential portion showing one embodiment of a tire of the present invention.

As shown in FIG. 1, the growth and penetration of crack C due to cut damage from the outer surface 1 of the tire toward the inner surface 2 is diverged along a fault surface 4 having an extremely low adhesion as shown by a zigzag arrow mark by providing the fault surface 4 in a liner layer 5 disposed inside and adjacent to a carcass layer 3. As the result, the growth and penetration of the crack toward the inner surface 2 of the tire is intercepted. Providing a low modulus middle rubber layer having a modulus lower than that of the adjoining rubber in place of the fault surface 4 in the figure, the same result can be obtained.

The inventors have confirmed that the intercepting effect can be attained by providing a low modulus middle rubber layer as mentioned above by comparing crack growing speeds of test pieces as shown in FIGS. 2a and 2b.

That is, the test pieces as shown in FIGS. 2a and 2b are rubber pieces 6, 6′ each having a length of 130 mm × a width of 25 mm × a thickness of 8 mm and a 300% modulus of 55 kg/cm². However, one of the test pieces has such a sandwich structure that a middle rubber layer 7 having a thickness of 2 mm and a 300% modulus of 25 kg/cm² is embedded in a substantially center of the thickness of the rubber piece 6′ as shown in FIG. 2b.

A cut damage 8 is formed from the upper surface of each of the test pieces 6, 6′ up to a position corresponding to substantially ¼ of the thickness of each test piece. Thereafter, the crack growth from the cut damage 8 is measured by subjecting the test piece to strong repeated strains under a tension force of about 20% in the lengthwise direction as shown by an arrow in FIGS. 2a and 2b. As a result, in the test piece 6 having no low modulus middle rubber layer 7 as shown in FIG. 2a, the crack growth continues toward the lower surface of the test piece 6 and finally this piece is cut in halves at the strain repeating number of $1 \times 10^6$. On the other hand, in the test piece 6′ provided therein with the low modulus middle rubber layer 7 as shown in FIG. 2b, the crack growth is intercepted by this middle rubber layer and does not continue over the rubber layer toward the lower surface of the test piece.

Based on the above experiments and considerations, the present invention provides a pneumatic tire having an excellent cut resistance, comprising an annular crown portion constituting a tread, a pair of side portions supporting said crown portion, a pair of bead portions located at each foot of said side portions for fitting to a rim, a carcass layer composed of at least one rubberized cord ply toroidally extending between said bead portions and a liner layer disposed inside and adjacent to said carcass layer, characterized in that a fault surface having an extremely low adhesion which intercepts the crack growth from the outside of the tire is arranged in said liner layer at at least a part of a region extending between said bead portions, or that a low modulus middle rubber layer composed of rubber having a modulus lower than that of the adjoining rubber which intercepts the crack growth from the outside of the tire is arranged in the tire at at least a part of a region extending between said bead portions.

According to the invention, the term "liner layer" used herein means a reinforcing layer consisting mainly of a rubbery elastomer layer located adjacent to and at the inside of the carcass layer except an inner liner usually attached to the innermost portion of the tire for sealing.

It is most effective that the fault surface 4 or the low modulus middle rubber layer 7 in the present invention is provided at the side portion of the pneumatic tire to be applied for running on rough grounds, particularly near the position corresponding to maximum sectional width of the carcass layer in the side portion, and in the case of radial tires, such a portion is particularly effective. But it is, of course, useful to provide the fault surface or the low modulus middle rubber layer in the crown portion or a region extending from the side portion to the crown portion in accordance with the use purpose.

If the fault surface 4 of the present invention is provided outside the carcass layer 3, there is fear that the separation is caused because this portion is particularly large in the deformation. Therefore the fault surface 4 is formed in at least one portion of at the inner part of the liner layer 5 itself provided inside and adjacent to the carcass layer 3 and between said layer 5 and the carcass layer 3.

The fault surface 4 in the present invention is preferred to have a peeling resistance force of not more than 7.5 kg/cm, preferably not more than 5 kg/cm per unit breadth. When the peeling resistant force exceeds 7.5 kg/cm, the effect for intercepting the growth of crack is not satisfactorily obtained.

But of course, the two layers which interpose the fault surface 4 between them are adhered to each other and the separation of these layers does not occur from the fault surface 4 so long as the cut growth from the outside of the tire does not reach the fault surface under the normal use condition of the tires of this type.

When the fault surface is formed between two or more rubbery elastomeric layers forming the liner layer 5, 100% modulus of the rubber positioning at the inside among the two rubbery elastomeric layers arranged so as to interpose the fault surface between these layers, is desirable to be not less than 20 kg/cm², preferably not less than 45 kg/cm² in view of prevention of the growth of crack.

Furthermore, it is preferable that the liner layer 5 includes a cord reinforcing layer 9 consisting of at least one rubberized cord ply as shown in FIG. 3. This is because when the tire is subjected to cut damage the circumferential strain owing to load concentrates at this cut damage portion but the above described cord reinforcing layer 9 serves to prevent this concentration. In this case, it is preferable to locate the cord reinforcing layer inside the fault surface 4 or the low modulus middle rubber layer 7 in view of the mitigation of strain concentration. And in particular, when the carcass layer 3 is a radial structure, it is preferable in the same view indicated above to cross the cords in the cord reinforcing layer 9 with the cords in the carcass layer 3 at an angle of not larger than 35°.

The embodiment of FIG. 3 shows the case where the fault surface 4 is formed at the interior of the liner layer 5, and the numeral 10 is an inner liner.

The fault surface 4 may be easily formed by a simple process wherein silicon, petroleum and the like are applied on a bonding surface when the green case of the tire is formed.

In the present invention, a low modulus middle rubber layer 7 may be provided in place of the fault surface 4.

In case of arranging the low modulus middle rubber layer 7 in the side portion 18, the position of the middle rubber layer is at the interior of the rubber layer 19 of the side portion outside the carcass layer 3, between the rubber layer 19 of the side portion and the carcass layer 3, between the carcass layer 3 and the liner layer 5 or at the interior of the liner layer 5 itself. Alternatively, the low modulus middle rubber layer may be arranged in several regions at the above positions as far as there is no problem relating to heat generation, rigidity balance and the like. However, in case of arranging in the crown portion 15, the position of the middle rubber layer 7 should be between the carcass layer 3 and the liner layer 5 or at the interior of the liner layer 5 itself. In case of arranging the middle rubber layer 7 outside the carcass layer 3 of the side portion, the separation failure of the carcass ply or plies together with the air leakage by the crack growth from the outer surface of the tire can be advantageously prevented.

It is desirable that the rubber to be used in the formation of the low modulus middle rubber layer 7 has a 300% modulus of not more than 50 kg/cm$^2$, preferably not more than 30 kg/cm$^2$.

When the tire is subjected to cut damage, the concentration of strain occurs in the tip of crack produced by the damage at the loading deformation as previously described. This phenomenon is not a constant stress phenomenon but a constant strain phenomenon, so that the lower the modulus, the lower the stress and hence the crack growth is blocked.

Figure 4:
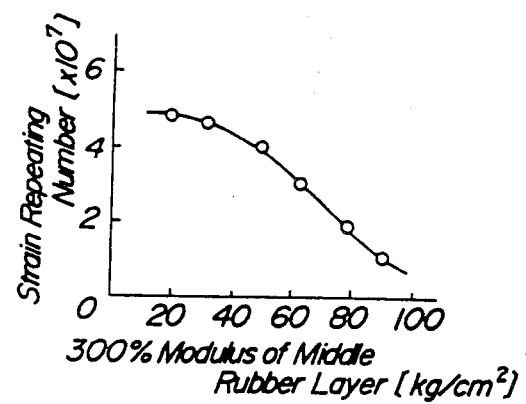
FIG. 4 is a graph showing a relation between the modulus of the middle rubber layer and the strain repeating number until the crack growth is fixed.

As apparent from FIG. 4 illustrating a relation between the modulus and the strain repeating number until the crack in the test piece 6' of FIG. 2b is fixed under a 10% tensile strain, the intercepting effect is conspicuous when 300% modulus of the middle rubber layer 7 is not more than 50 kg/cm$^2$, particularly not more than 30 kg/cm$^2$ hence, it is practically desired to use rubber having the above defined value of 300% modulus as the middle rubber layer.

Since the maximum value of strain in the strain concentration is about 500%, it is, of course, important the rubber used for the formation of the low modulus middle rubber layer is not broken at such a strain value. Considering that fact and further giving some allowance thereto, it is preferable that the elongation at breakage of the middle rubber layer is not less than 600%.

In order to sufficiently develop the intercepting effect of the invention, the difference of modulus between the rubber forming the low modulus middle rubber layer and the rubber adjacent to the middle rubber layer is not less than 20 kg/cm$^2$, preferably not less than 40 kg/cm$^2$ in the 300% modulus.

According to the invention, the thickness of the low modulus middle rubber layer is preferably 0.2 to 5 mm, more preferably 2 to 3 mm. When the thickness is less than 0.2 mm, the effect of the invention is not sufficiently developed and also the production is difficult, while when the thickness exceeds 5 mm, the rigidity balance becomes bad, the cut damage itself is apt to be suffered and also there is left a problem relating to the heat generation.

Further, in the present invention, it is preferable, of course, to form the fault surface having an extremely low adhesion between the low modulus middle rubber layer and the adjacent rubber thereof.

The following examples are given for the purpose of illustration of this invention and are not intended as limitations thereof.

Figure 5:
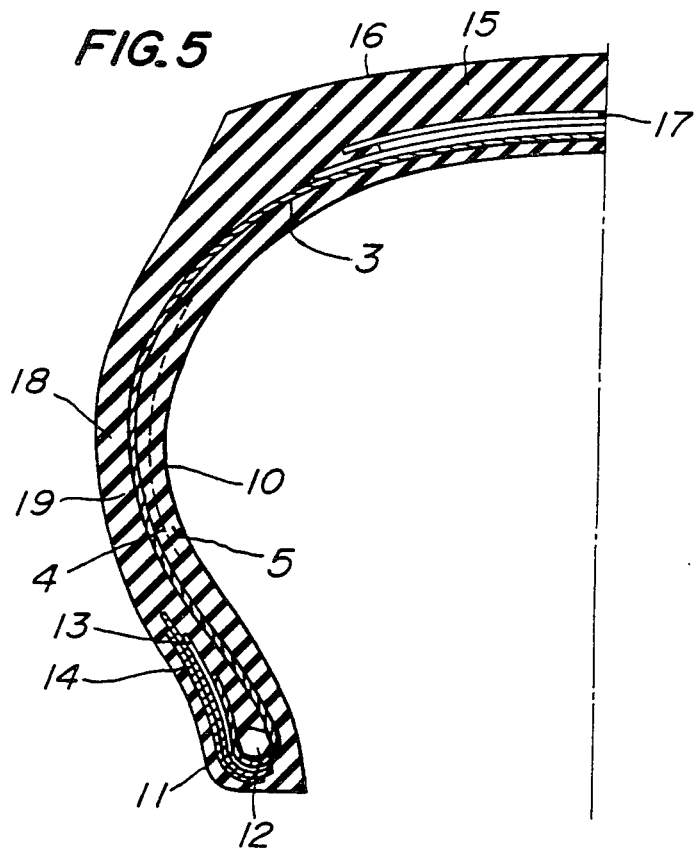
FIG. 5 is a left half cross-sectional view of an embodiment of the tire according to the present invention.

FIG. 5 shows an example wherein the present invention is applied to a pneumatic radial tire of a tire size of 20.5 R 20 for running on rough ground in a cross-section with respect to only the left half and the right half has the same structure.

In this case, a carcass layer 3 consists of one rubberized ply containing steel cords embedded therein and arranged along the radial plane of the tire and is turned around a bead core 12 in a bead portion 11 from inside to outside. In the bead portion 11 are further arranged a metal chafer 13 composed of one rubberized layer containing steel cord embedded therein, and a fiber chafer 14 composed of two rubberized layers each containing nylon cords embedded therein, the cords of which being crossed with each other, as a reinforcement. In a crown portion 15 is arranged a belt layer 17 composed of three steel cord plies between the carcass layer 3 and a tread 16.

In the innermost surface of the tire, an inner liner 10 is applied along between both the left and right bead portions, and according to this invention, a liner layer 5 is disposed between the inner liner 10 and the carcass layer 3.

In the illustrated tire in FIG. 5, the liner layer 5 is mainly composed of a rubbery elastomeric layer having a 100% modulus of 25 kg/cm$^2$ (300% modulus of 65 kg/cm$^2$), and provided at its inside with a cord reinforcing layer (not shown) of two cord plies extending from the bead portion 11 to the shoulder portion, the cords of which are crossed in an angle of 15° with respect to the radial direction of the tire.

In this example, the fault surface 4 is formed at the interior of the liner layer 5 near a position corresponding to the substantially maximum sectional width of the carcass layer in the side portion of the tire. This fault surface 4 is formed by applying petroleum when forming the green case. In this example, the fault surfaces having an extremely low adhesion are provided at both the left and right sides but of course the present invention includes the case where the fault surface is formed only in one side portion.

FIG. 3 is a diagrammatic view showing the arranging relation of each layer in the portion having the maximum sectional width in the side portion of the embodiment of FIG. 5.

Figure 6:
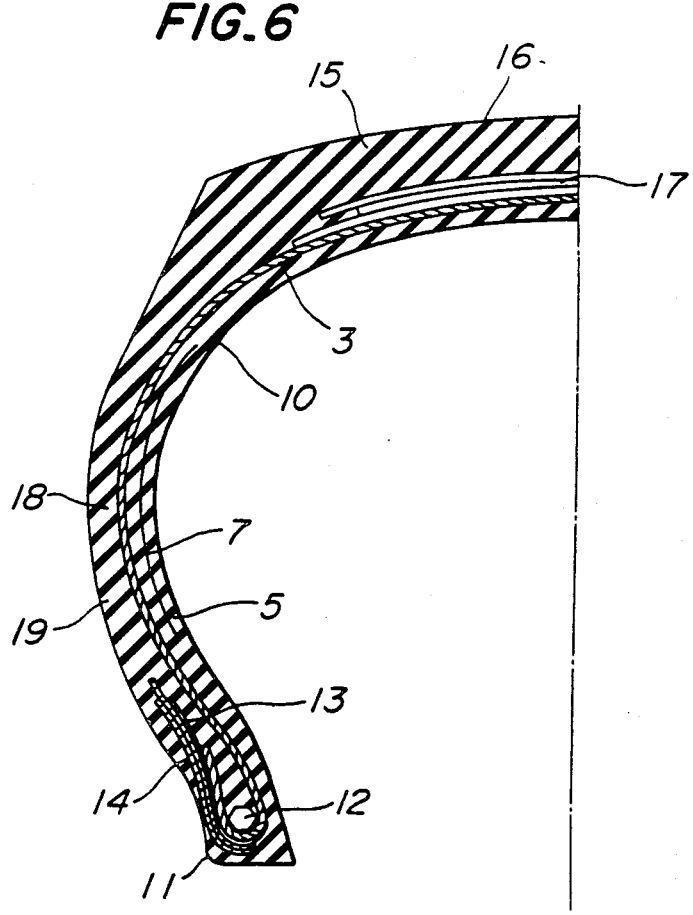
FIG. 6 is a left half cross-sectional view of another embodiment of the tire according to the present invention.

FIG. 6 shows another example of the tire of the present invention applying a low modulus middle rubber layer 7 in place of the fault surface 4 of the example in FIG. 5.

The tire size is 20.5 R 20 and the inner structure of the tire is just the same with that of the tire shown in FIG. 5 except for arranging the middle rubber layer 7 in place of the fault surface 4.

In this example, the liner layer 17 is composed of a rubbery elastomeric layer having a 300% modulus of 65 kg/cm$^2$ and a cord reinforcing layer (not shown) provided at the inside of the rubbery elastomeric layer, as is in the case of FIG. 5.

But in this example, the low modulus middle rubber layer 7 having a 300% modulus of 22 kg/cm$^2$, an elongation at breakage of 895% and a thickness of 2.5 mm is arranged at the interior of the rubbery elastomeric layer of the liner layer 5 near a position corresponding to the substantially maximum sectional width of the carcass layer in the side portion. The middle rubber layer is arranged in each of the side portions, but may be arranged in either side portion. Moreover, the coating rubber for the carcass ply has a 300% modulus of 120 kg/cm$^2$.

Figure 7:
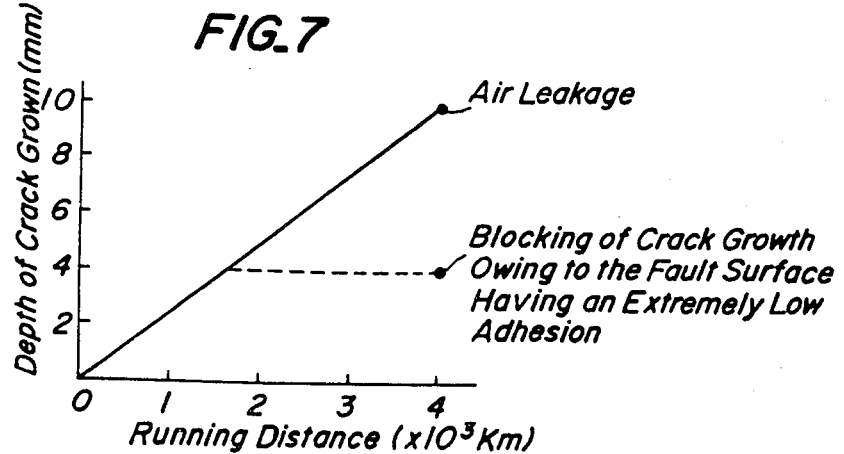
FIG. 7 is a graph of a test result showing the effect of the present invention.

A durability test on a drum was made with respect to the tire according to the invention as shown in FIG. 5 to obtain a result as shown in FIG. 7, wherein a solid line is the case of a comparative tire and a dotted line is the case of the tire shown in FIG. 5. The comparative tire has the same structure as shown in FIG. 5 except the absence of the fault surface. In this test, a cut damage was first formed in the side portion of the tire near the maximum width thereof at such a depth that the tip of the cut damage locates slightly outside the carcass layer 3, and then the depth of crack grown from the cut damage during the running was measured in a direction perpendicular to the carcass ply.

As apparent from FIG. 7, the tire of FIG. 5 according to the invention is clearly different from the comparative tire in the tire performances. That is, in the comparative tire of the usual structure having no fault surface, the crack grew with the increase of the running distance and finally produces air leakage at a running distance of about $4 \times 10^3$ km. While, in the tire according to the invention, the crack growth was intercepted by the fault surface 4 and as a result, no air leakage occurred even at the same running distance as described above.

Another test was made with respect to the tire according to the invention as shown in FIG. 6 and the comparative tire having the same structure as shown in FIG. 6 except the absence of the low modulus middle rubber layer, and the result was just the same as shown in FIG. 7 obtained by the previous test.

Another test was made by arranging the low modulus middle rubber layer 7 at the interior of the rubber layer 19 of the side portion 18 or between the rubber layer 14 and the carcass layer 4. In this case, the separation failure of carcass ply could also effectively be prevented.

According to the invention, when the pneumatic tire for use in off-road vehicles is subjected to cut damage, the growth of the cut damage is effectively intercepted and the air leakage failure or further the separation failure can advantageously be prevented without degrading other tire performances.

What is claimed is:

1. A pneumatic tire having an excellent cut resistance, comprising: an annular crown portion constituting a tread, a pair of side portions supporting said crown portion, a pair of bead portions located at each foot of said side portions for fitting to a rim, a carcass layer composed of at least one rubberized cord ply toroidally extending between said bead portions and a liner layer disposed inside and adjacent to said carcass layer, and, a low modulus middle rubber layer consisting of rubber having a 300% modulus of not more than 30 kg/cm$^2$ and lower than that of the rubber adjacent to said middle rubber layer, said middle rubber layer intercepting the crack growth from the outside of the tire, said low modulus middle rubber layer disposed in said liner layer at said side portion and having a thickness of 0.2 to 5 mm.

2. The tire as claimed in claim 1, wherein said low modulus middle rubber layer is provided at at least a region of said side portion including a maximum sectional width of said carcass layer.

3. The tire as claimed in claim 1, wherein said low modulus middle rubber layer is provided over a whole region of said side portion extending from an upper part of said bead portion to a shoulder portion.

4. The tire as claimed in claim 1, wherein said rubber has an elongation at breakage of not less than 600%.

5. The tire as claimed in claim 1, wherein said low modulus middle rubber layer is arranged directly adjacent to said carcass layer.

6. The tire as claimed in claim 1, wherein said low modulus middle rubber layer is arranged at the interior of said liner layer itself.

7. The tire as claimed in claim 1, wherein said liner layer is provided with at least one cord reinforcing layer at the inside of said low modulus middle rubber layer.

8. The tire as claimed in claim 7, wherein the cords in said cord reinforcing layer in the liner layer cross with the cords in the carcass layer at an angle of not larger than 35°.

9. The tire as claimed in claim 1, wherein said carcass layer is a radial carcass made of metal cords.

10. The tire as claimed in claim 1, wherein said low modulus middle rubber layer has a thickness of 2 and 3 mm.

* * * * *